Nov. 24, 1953  J. WEIN  2,659,926
BALL TYPE CASTER
Filed March 20, 1952
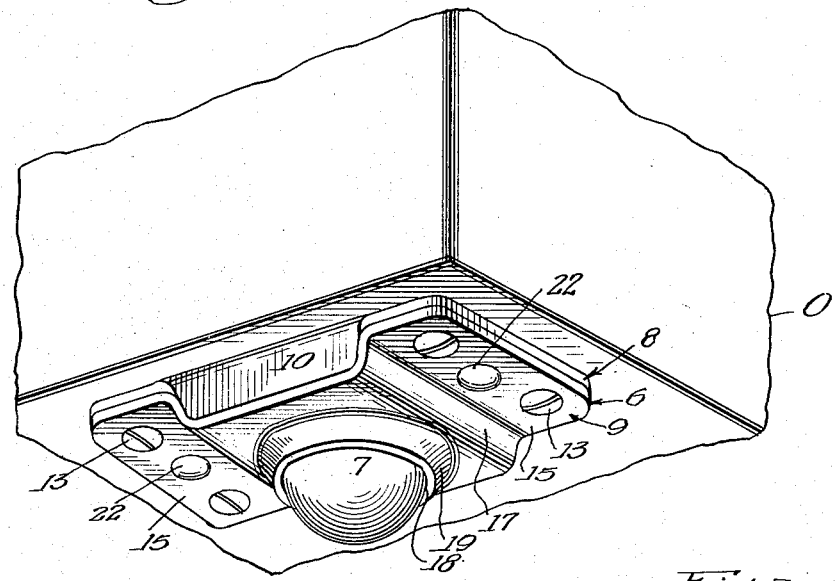
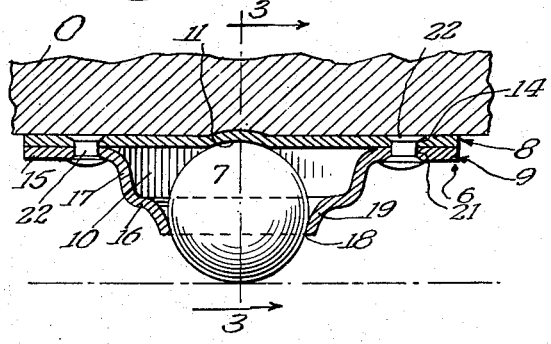
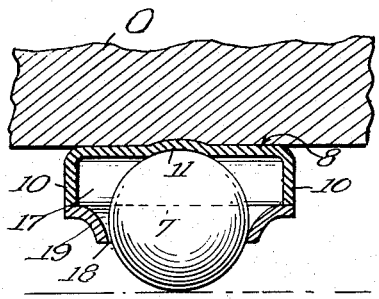
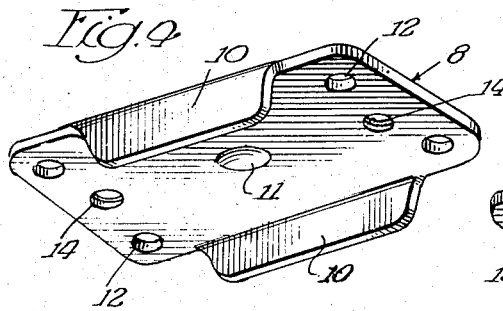
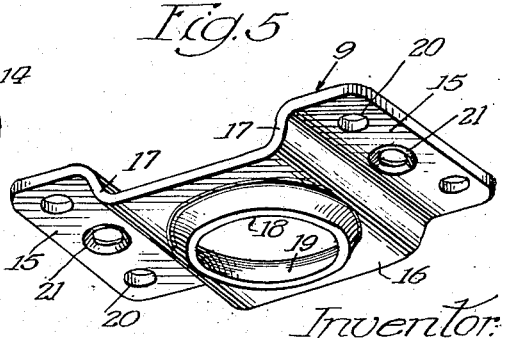
Inventor:
Joseph Wein
By: Fred Gerlach atty.

Patented Nov. 24, 1953

2,659,926

UNITED STATES PATENT OFFICE 2,659,926

BALL TYPE CASTER

Joseph Wein, Chicago, Ill.

Application March 20, 1952, Serial No. 277,585

4 Claims. (Cl. 16—24)

1

The present invention relates generally to casters. More particularly the invention relates to that type of caster which is adapted to be applied to the bottom surface of an object, serves, when in place, to support the object so that it is capable of being moved readily from place to place and comprises a composite housing-forming bracket and a freely rotatable, truly spherical ball which is disposed for the most part in the housing that is formed by the bracket.

One object of the invention is to provide a caster which is an improvement upon, and has certain inherent advantages over, previously designed casters of the aforementioned type and is characterized by high efficiency, simplicity of construction and low cost of manufacture.

Another object of the invention is to provide a caster of the type under consideration in which the composite bracket for partially housing and rotatably supporting the ball is of simple and novel construction and comprises: (1) a rectangular, substantially flat, horizontally extending top plate which is formed of a one-piece metal stamping, has the central portion thereof deflected upwards to form a downwardly facing, shallow, concave seat for the top portion of the ball and is provided on the central portions of the side margins thereof with integral downwardly extending right angle flanges having straight horizontal bottom edges and the ends thereof terminating small distances inwards of the end edges of the top plate; and (2) a complemental rectangular, generally horizontal bottom plate which is formed of a one-piece metal stamping, is disposed beneath the top plate, has the central portion thereof deflected downwards so that it consists of a pair of horizontal end parts, a horizontal central part at a lower level than the end parts and a pair of substantially vertical parts with the lower margins thereof connected to the end margins of the central part and their upper margins connected to the inner end margins of the end parts, is arranged so that the end parts thereof abut against the end parts of the top plate, the side margins of its central part abut against the bottom edges of the flanges of the top plate and the end margins of the substantially vertical parts abut against the ends of said flanges, embodies a circular hole in the central portion of its central part and has the hole defining portion of its central part deflected downwards to form a downwardly tapered seat for the portion of the ball that is between the latter's central and bottom portions.

A further object of the invention is to provide

2 a ball type caster which is generally of new and improved construction and effectively and efficiently fulfills its intended purpose.

Other objects of the invention and the various advantages and characteristics of the present caster will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a bottom perspective showing a ball type caster embodying the invention applied to the bottom surface of an object;

Figure 2 is a vertical longitudinal section of the caster illustrating in detail the construction and design of the top and bottom plates of the composite housing-forming bracket and showing the manner in which the truly spherical ball is rotatably mounted;

Figure 3 is a vertical transverse section taken on the line 3—3 of Figure 2;

Figure 4 is a bottom perspective of the top plate of the housing-forming bracket; and Figure 5 is a bottom perspective of the bottom plate of the bracket.

The caster which is shown in the drawing constitutes the preferred form or embodiment of the invention. It serves either alone or with similar casters to support an object O so that it is capable of being moved readily from place to place. The object O may be a piece of luggage, such as a "Gladstone" bag, or it may be a piece of furniture, such as a chair, table, desk, cabinet or bed. The object O that is shown fragmentarily in the drawing is one corner of a large sized piece of luggage. As its principal parts or components the caster comprises a one-piece bracket 6 and a ball 7.

The bracket 6 serves as a housing and supporting medium for the ball 7 and consists of a top plate 8 and a complemental bottom plate 9. The top plate 8 is rectangular and substantially flat and is adapted to fit against the bottom surface of the object O. It is formed of a one-piece metal stamping and embodies on the central portions of the side margins thereof a pair of integral downwardly extending right angle flanges 10. The latter are disposed in opposed and parallel relation and have straight horizontal bottom edges. As shown in Figures 1, 2 and 4 of the drawing the ends of the flanges 10 terminate small distances inwards of the end edges of the top plate 8. The central portion of the top plate is deflected or struck upwards so as to form a downwardly facing, shallow, concave seat 11, the purpose of which is described hereafter. The corners of the top plate are provided with vertically extending, circular, open ended holes 12 for receiving or accommodating the shanks of vertically extending attaching screws 13. When the top plate 8 of the bracket is secured in place by the screws 13 the upwardly deflected or struck seat defining central portion embeds itself in the bottom surface of the object O. In addition to the screw receiving holes 12 the top plate 8 is provided with vertically extending open ended holes 14. The latter are formed in the end parts of the top plate and are disposed substantially midway between the holes 12 in the corners of the top plate. The downwardly extending right angle flanges of the top plate serve to reenforce the top plate against longitudinal bending or distortion. The complemental bottom plate 9 is lengthwise and crosswise the same in shape as the top plate 8. It is disposed directly beneath the top plate and is formed of a one-piece metal stamping. The central portion of the bottom plate 9 is deflected, struck or stamped downwards so that the bottom plate as a whole consists of a pair of horizontal end parts 15, a horizontal central part 16 at a lower level than the end parts 15, and a pair of substantially vertical parts 17. The lower margins of the vertically extending parts 17 are connected directly to the end margins of the central part 16 and the upper margins of the parts 17 are connected directly to the inner end margins of the end parts 15. When the bracket 6 is in its assembled position the end parts 15 of the bottom plate abut directly against the end parts of the top plate 8, the side margins of the central part 16 abut against the bottom edges of the flanges 10, and the end margins of the parts 17 abut against the ends of said flanges. The horizontal central part 16 of the bottom plate 9 defines with the substantially vertical parts 17, the flanges 10 and the superjacent central part 16 of the top plate 8, a housing in which the ball 7 is for the most part disposed. The bottom plate 9 embodies a circular hole 18 in the central portion of its central part 16 and has the hole defining portion of said central part deflected downwards so as to form a downwardly tapered annular seat 19. The hole and seat are concentrically positioned with respect to the downwardly facing, shallow, concave seat 11 in the central portion of the top plate 8. The end portions of the horizontal end parts 15 of the bottom plate have vertically extending, open ended, circular holes 20 formed therein and these register with the holes 12 in the corners of the top plate 8 and are adapted to receive the shanks of the attaching screws 13. The central portions of the end parts 15 are provided with vertically extending, open ended, circular holes 21 as shown in Figures 2 and 5 of the drawing. Said holes 21 are in registry with the holes 14 in the end parts of the top plate 8. Head equipped rivets 22 extend through the holes 14 and 21 and serve permanently to secure the top and bottom plates 8 and 9 together. The depending or downwardly extending flanges 10 have a two fold purpose in that they serve not only to reenforce the top plate 8 against longitudinal bending, but also to hold the downwardly tapered annular seat 19 in fixed spaced relation with respect to the seat 11.

The ball 7 is formed of steel or other suitable rigid material and has the diameter thereof greater than the distance between the central part 16 of the bottom plate 9 and the superjacent central portion of the top plate 8. It is disposed for the most part in the housing and has the top portion thereof mounted movably in the downwardly facing shallow concave seat 11 and the portion thereof that is between its central and bottom portions mounted movably in the downwardly tapered annular seat 19. The bottom portion of the ball is disposed exteriorly of the aforementioned housing and is adapted to rest on any supporting surface over which the object O is placed. The seats 11 and 19 serve to support the ball so that it is freely rotatable. In addition, they coact to hold the ball against horizontal or vertical displacement with respect to the bracket.

The caster is assembled by first placing the ball 7 in the downwardly tapered annular seat 19 in the central part 16 of the bottom plate 9. Thereafter the top and bottom plates are brought into juxtaposition and are then permanently secured together by inserting the rivets 22 through the registering holes 14 and 21. When the parts of the caster are in assembled relation the housing in which the ball is for the most part disposed is substantially airtight and hence dust is precluded from entering into the interior of the housing and lodging on the housing enclosed portions of the ball.

The herein described ball type caster is essentially simple in design and hence may be manufactured or fabricated at an extremely low cost. It effectively and efficiently fulfills its intended purpose and possesses long life due to the particular construction and design of the composite bracket 6, which, as heretofore pointed out, consists of the stamped metal top and bottom plates 8 and 9.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, a ball type caster adapted to be applied to the bottom surface of an object and when in place to support the object so that it is capable of being moved readily from place to place and comprising a substantially rectangular and flat horizontally extending top plate adapted to fit against said bottom surface of the object and provided on the central portions of the side margins thereof with integral downwardly extending right angle flanges having the ends thereof terminating small distances inwards of the end edges of the top plate, a complemental substantially rectangular generally horizontal bottom plate disposed beneath the top plate and shaped so that it consists of a pair of horizontal end parts, a horizontal central part at a lower level than the end parts and a pair of substantially vertical parts with the lower margins thereof connected to the end margins of the central part and their upper margins connected to the inner end margins of the end parts, said bottom plate being arranged so that the end parts thereof abut against the end parts of the top plate, the side margins of said central part thereof abut against the bottom edges of the flanges and the end margins of the substantially vertical parts thereof abut against the ends of said flanges, and having said central part thereof forming with said vertically extending parts, the flanges and the superjacent central part of the top plate a housing, the central portion of said central part of said bottom plate having a circular hole therethrough, a spherical ball having the diameter thereof greater than the distance between the central part of the bottom plate and the superjacent central part of the top plate, disposed for the most part in said housing, and having the top portion thereof movably mounted adjacent said superjacent central part of the top plate and the portion thereof that is between its central and bottom portions disposed in said circular hole and fitting movably against the hole defining portion of said central part of the bottom plate, means for securing said plates in connected relation, and means whereby the plates may be attached to said object.

2. As a new article of manufacture, a ball-type caster adapted to be applied to the bottom surface of an object and when in place to support the object so that it is capable of being moved readily from place to place and comprising a substantially rectangular and flat horizontally extending top plate adapted to fit against said bottom surface of the object, having the central portion thereof shaped to form a downwardly facing, shallow, concave seat, and provided on the central portions of the side margins thereof with integral downwardly extending right angle flanges having straight horizontal bottom edges and the ends thereof terminating small distances inwards of the end edges of the top plate, a complemental substantially rectangular generally horizontal bottom plate disposed beneath the top plate and shaped so that it consists of a pair of horizontal end parts, a horizontal central part at a lower level than the end parts and a pair of substantially vertical parts with the lower margins thereof connected to the end margins of the central part and their upper margins connected to the inner end margns of the end parts, said bottom plate being arranged so that the end parts thereof abut against the end parts of the top plate, the side margins of said central part thereof abut against the bottom edges of the flanges and the end margins of the substantially vertical parts thereof abut against the ends of said flanges, and having the central part thereof forming with said vertically extending parts, the flanges and the superjacent central parts of the top plate a housing, the central portion of said central part of said bottom plate having a circular hole therethrough, a spherical ball having the diameter thereof greater than the distance between the central part of the bottom plate and said superjacent central part of the top plate, disposed for the most part in said housing, and having the top portion thereof mounted movably in said downwardly facing shallow concave seat and the portion thereof that is between its central and bottom portions disposed in said circular hole and fitting movably against the hole defining portion of said central part of the bottom plate, means for securing said plates in connected relation, and means whereby the plates may be attached to said object.

3. As a new article of manufacture, a ball type caster adapted to be applied to the bottom surface of an object and when in place to support the object so that it is capable of being moved readily from place to place and comprising a substantially rectangular and flat horizontally extending top plate adapted to fit against said bottom surface of the object and provided on the central portions of the side margins thereof with integral downwardly extending right angle flanges having straight horizontal bottom edges and the ends thereof terminating small distances inwards of the end edges of the top plate, a complemental substantially rectangular generally horizontal bottom plate formed of a one-piece metal stamping, disposed beneath the top plate, and having the central portion thereof deflected downwards so that it consists of a pair of horizontal end parts, a horizontal central part at a lower level than the end parts and a pair of substantially vertical parts with the lower margins thereof connected to the end margins of the central part and their upper margins connected to the inner end margins of the end parts, said bottom plate being arranged so that the end parts thereof abut against the end parts of the top plate, the side margins of said central part thereof abut against the bottom edges of the flanges and the end margins of the substantially vertical parts thereof abut against the ends of said flanges, and having said central part thereof forming with the vertically extending parts thereof, the flanges and the superjacent central part of the top plate a housing, the central portion of said central part of said bottom plate having a circular hole therethrough and having its hole defining portion deflected downwards to form a downwardly tapered annular seat, a spherical ball having the diameter thereof greater than the distance between the central part of the bottom plate and the superjacent central part of the top plate, disposed for the most part in said housing, and having the top portion thereof movably mounted adjacent said superjacent central part of the top plate and the portion thereof that is between its central and bottom portions mounted movably in said downwardly tapered annular seat, means for securing said plates in connected relation, and means whereby the plates may be attached to said object.

4. As a new article of manufacture, a ball type caster adapted to be applied to the bottom surface of an object and when in place to support the object so that it is capable of being moved readily from place to place and comprising a substantially rectangular and flat horizontally extending top plate formed of a one-piece metal stamping, adapted to fit against said bottom surface of the object, having the central portion thereof deflected upwards to form a downwardly facing shallow concave seat, and provided on the central portions of the side margins thereof with integral downwardly extending right angle flanges having straight horizontal bottom edges and the ends thereof terminating small distances inwards of the end edges of the top plate, a complemental substantially rectangular generally horizontal bottom plate formed of a one-piece metal stamping, disposed beneath the top plate, and having the central portion thereof deflected downwards so that it consists of a pair of horizontal end parts, a horizontal central part at a lower level than the end parts and a pair of substantially vertical parts with the lower margins thereof connected to the end margins of the central part and their upper margins connected to the inner end margins of the end parts, said bottom plate being arranged so that the end parts thereof abut against the end parts of the top plate, the side margins of said central part thereof abut against the bottom edges of the flanges and the end margins of the substantially vertical parts thereof abut against the ends of said flanges, and having the central part thereof forming with the vertically extending parts thereof, the flanges and the superjacent central part of the top plate a housing, the central portion of said central part of said bottom plate having a circular hole therethrough and having its hole defining portion deflected downwards to form a downwardly tapered annular seat, a spherical ball having the diameter thereof greater than the distance between the central part of the bottom plate and said superjacent central part of the top plate, disposed for the most part in said housing, and having the top portion thereof mounted movably in said downwardly facing shallow concave seat and the portion thereof that is between its central and bottom portions mounted movably in said downwardly tapered annular seat, means between the end parts of the top and bottom plates for securing said plates in connected relation, and means whereby the plates may be attached to said object.

JOSEPH WEIN.

References Cited in the file of this patent
UNITED STATES PATENTS

| Number | Name | Date |
|---|---|---|
| 356,483 | Loos | Jan. 25, 1887 |
| 843,153 | Kuhsiek | Feb. 5, 1907 |